US009525968B2

United States Patent
Pounds et al.

(10) Patent No.: US 9,525,968 B2
(45) Date of Patent: Dec. 20, 2016

(54) METHODS, SYSTEMS, AND COMPUTER READABLE MEDIA FOR USING BLUETOOTH BEACON INFORMATION TO OBTAIN AND PUBLISH FINE GRAINED USER LOCATION INFORMATION

(71) Applicant: BroadSoft, Inc., Gaithersburg, MD (US)

(72) Inventors: Gregory Eugene Pounds, San Jose, CA (US); Victor Yordanov Mutsev, Sofia (BG); Parag Talekar, San Jose, CA (US)

(73) Assignee: BROADSOFT, INC., Gaithersburg, MD (US)

( * ) Notice: Subject to any disclaimer, the term of this patent is extended or adjusted under 35 U.S.C. 154(b) by 0 days.

(21) Appl. No.: 14/509,026

(22) Filed: Oct. 7, 2014

(65) Prior Publication Data
US 2016/0100282 A1 Apr. 7, 2016

(51) Int. Cl.
*H04W 4/02* (2009.01)
*H04W 4/00* (2009.01)

(52) U.S. Cl.
CPC .............. *H04W 4/02* (2013.01); *H04W 4/008* (2013.01)

(58) Field of Classification Search
CPC ........ H04W 4/02; H04W 4/025; H04W 64/00; H04W 64/006; H04M 1/72572; H04M 2250/02; H04M 1/72569; H04M 2242/14; H04N 21/4524; G06Q 50/01; G06Q 30/00; G06Q 30/0241; G06Q 10/063114; G06Q 30/0259; H04L 63/0492
See application file for complete search history.

(56) References Cited

U.S. PATENT DOCUMENTS 6,542,819 B1 4/2003 Kovacs et al.
7,031,875 B2 * 4/2006 Ellenby .................. G01C 21/20
702/150

(Continued)

OTHER PUBLICATIONS

Kavitha Muthukrishnan, Maria Lijding, Paul Havinga, Towards Smart Surroundings: Enabling Techniques and Technologies for Localization, Lecture Notes in Computer Science, vol. 3479, Jan 2Hazas, M., Scott, J., Krumm, J.: Location-Aware Computing Comes of Age. IEEE Computer, 37(2):95-97, Feb. 2004 005, Pa005, pp. 350-362.).*

(Continued)

*Primary Examiner* — Nizar Sivji
(74) *Attorney, Agent, or Firm* — Jenkins, Wilson, Taylor & Hunt, P.A.

(57) ABSTRACT

The subject matter described herein includes methods, systems, and computer readable media for utilizing Bluetooth beacon identification information to obtain and publish fine grained user location information. One method includes storing a plurality of Bluetooth beacon identifiers in a mobile device. The method further includes, receiving, from a Bluetooth beacon, a Bluetooth beacon identifier. The method further includes determining whether the received Bluetooth beacon identifier corresponds to one of the stored Bluetooth beacon identifiers. In response to determining that the received Bluetooth beacon identifier corresponds to one of the stored Bluetooth beacon identifiers, the method includes querying a Bluetooth beacon location server for location information corresponding to the Bluetooth beacon identifier. The method further includes receiving Bluetooth beacon location information from the server and publishing the Bluetooth beacon location description to subscribers of a user of the mobile device.

27 Claims, 6 Drawing Sheets

(56) References Cited

U.S. PATENT DOCUMENTS

| | | | |
|---|---|---|---|
| 7,620,404 | B2 | 11/2009 | Chesnais et al. |
| 8,331,952 | B2 | 12/2012 | Pagonis et al. |
| 8,831,645 | B2 | 9/2014 | Agarwal et al. |
| 2013/0252594 | A1 | 9/2013 | Faillaci et al. |
| 2013/0281084 | A1 | 10/2013 | Batada et al. |
| 2014/0087758 | A1 | 3/2014 | Maor |
| 2014/0094196 | A1 | 4/2014 | Mahoney |
| 2014/0250191 | A1 | 9/2014 | Altman et al. |
| 2015/0018011 | A1* | 1/2015 | Mendelson .......... G01C 21/206 455/456.3 |

OTHER PUBLICATIONS

"iBeacon," http://en.wikipedia.org/wiki/iBeacon, pp. 1-8 (Last Modified Sep. 23, 2014).
"Getting Started with iBeacon," Version 1.0, Apple, pp. 1-11 (Jun. 2, 2014).
Wagner, "Developing iOS 7 Applications with iBeacons Tutorial," http://www.raywenderlich.com/66584/ios7-ibeacons-tutorial, pp. 1-16 (Apr. 22, 2014).
Notification of Transmittal of the International Search Report and the Written Opinion of the International Searching Authority, or the Declaration for International Application No. PCT/US2015/054317 (Jan. 22, 2016).

* cited by examiner

METHODS, SYSTEMS, AND COMPUTER READABLE MEDIA FOR USING BLUETOOTH BEACON INFORMATION TO OBTAIN AND PUBLISH FINE GRAINED USER LOCATION INFORMATION

TECHNICAL FIELD

The subject matter described herein relates to publishing mobile device user location information. More particularly, the subject matter described herein relates to methods, systems, and computer readable media for utilizing Bluetooth beacon information to obtain and publish fine grained user location information.

BACKGROUND

With the increased computing power of mobile devices and the popularity of social networking, mobile device users are selectively making their locations available to other users. For example, mobile device users may communicate their locations to friends or co-workers. Existing technology for a mobile device to determine its location includes global positioning system (GPS) and cellular network signals. GPS location information is accurate in outdoor environments. However, some mobile devices may lack GPS transceivers and may thus be unable to derive location information from GPS signals.

In indoor environments, mobile devices with GPS transceivers may not have access to GPS satellites. Even if a GPS signal is available indoors, GPS location coordinates may not be sufficiently granular to distinguish between different rooms or offices. Cellular network derived location information is likewise only available when there is a radio connection to a base station. Such a connection may not be available in an indoor environment. In addition, cellular network derived location information may not be sufficiently granular to locate users within rooms, offices, or other fine grained indoor areas.

Bluetooth beacons are used by retailers in indoor environments to locate mobile devices. Low-cost Bluetooth beacons, such as iBeacons conforming to a specification available from Apple, Inc., are available from different manufacturers. iBeacons emit iBeacon identifiers to devices within close proximity to the iBeacons. The primary known use for iBeacons is for a retail establishment owner to locate customers within a store and provide location-based ads or promotions. However, determining the location of a user with respect to a room, an office, or other indoor structure and allowing the user to selectively make the user's location information available to other users in an efficient manner is not provided by retail iBeacon systems that are used for location targeted advertising.

Accordingly, there exists a need for methods, systems, and computer readable media for using Bluetooth beacon identification information to obtain and publish mobile device user location information.

SUMMARY

The subject matter described herein includes methods, systems, and computer readable media for utilizing Bluetooth beacon information to obtain and publish fine grained user location information. One method includes storing a plurality of Bluetooth beacon identifiers in a mobile device. The method further includes, receiving, from a Bluetooth beacon, a Bluetooth beacon identifier. The method further includes determining whether the received Bluetooth beacon identifier corresponds to one of the stored Bluetooth beacon identifiers. In response to determining that the received Bluetooth beacon identifier corresponds to one of the stored Bluetooth beacon identifiers, the method includes querying a Bluetooth beacon location server for location information corresponding to the Bluetooth beacon identifier. The method further includes receiving Bluetooth beacon location information from the server and communicating the Bluetooth beacon location information to a publish-subscribe server for access by a group of users via a publish-subscribe interface.

According to another aspect, a system for utilizing Bluetooth beacon information to obtain and publish fine grained user location information is provided. The system includes a mobile device. The mobile device includes a memory for storing a plurality of Bluetooth beacon identifiers. The mobile device further includes a location determining and publishing client for receiving, from a Bluetooth beacon, a Bluetooth beacon identifier. The location determining and publishing client determines whether the received Bluetooth beacon identifier corresponds to one of the stored Bluetooth beacon identifiers. In response to determining that the received Bluetooth beacon identifier corresponds to one of the stored Bluetooth beacon identifiers, the location determining and publishing client queries a Bluetooth beacon location server for location information corresponding to the Bluetooth beacon identifier. The location determining and publishing client receives Bluetooth beacon location information from the server and publishes the location information to subscribers of a user of the mobile device.

According to another aspect, a method for utilizing Bluetooth beacon information to obtain and publish a Bluetooth beacon location description. The method includes, at a Bluetooth Beacon location server, storing mappings between a plurality of Bluetooth beacon identifiers and Bluetooth beacon location descriptions. The method further includes receiving a query from a mobile device where the query includes a Bluetooth beacon identifier. The method further includes obtaining a Bluetooth beacon location description corresponding to the Bluetooth beacon identifier from one of the stored mappings. The method further includes providing the Bluetooth beacon location description to the mobile device.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
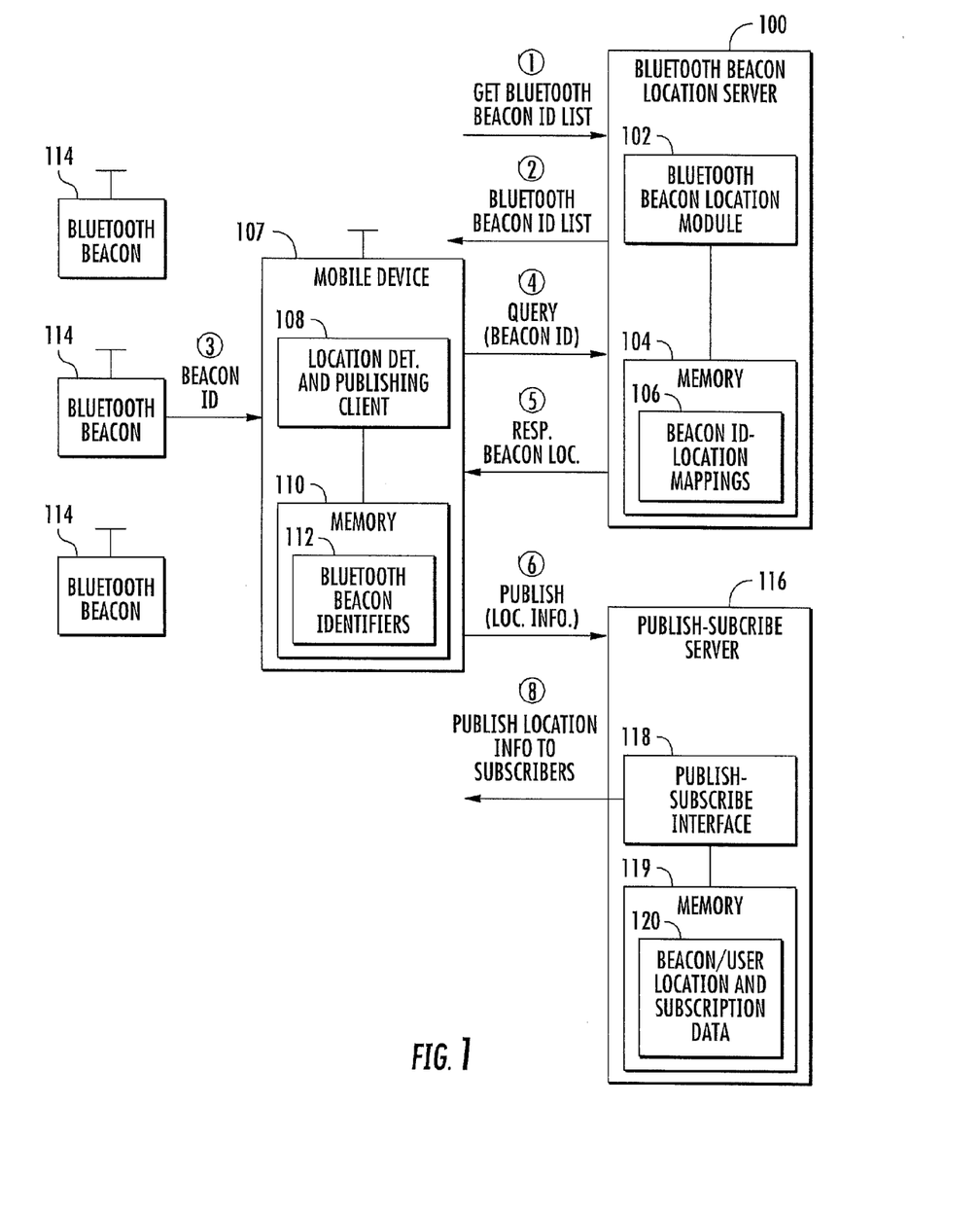
FIG. 1 is a network diagram illustrating a system for using Bluetooth beacon identification information to obtain and publish fine grained mobile device location information according to an embodiment of the subject matter described herein.

The subject matter described herein includes methods, systems, and computer readable media for using Bluetooth beacon identification information to obtain and publish user location information. FIG. 1 is a network diagram illustrating an exemplary system for using Bluetooth beacon identification information to obtain and publish mobile device user location information according to an embodiment of the subject matter described herein. Referring to FIG. 1, a Bluetooth beacon location server 100 includes a Bluetooth beacon location module 102 and a memory 104. Bluetooth beacon location module 102 processes queries for Bluetooth beacon location information from mobile devices. For example, Bluetooth beacon location module 102 may receive a query from a mobile device where the query includes a Bluetooth beacon identifier. Bluetooth beacon location module 102 may respond to the query with the corresponding Bluetooth beacon location information. In one embodiment, the Bluetooth beacon location information may be a Bluetooth beacon location description that describes the location of the Bluetooth beacon using a text string.

Memory 104 stores mappings 106 between Bluetooth beacon identifiers and Bluetooth beacon location descriptions. In one example, mappings 106 may map Bluetooth beacon identifiers to descriptions of offices where Bluetooth beacons are located. Table 1 shown below illustrates exemplary mappings 106 that may be stored by server 100.

TABLE 1

Stored Mappings between Bluetooth Beacon Identifiers and Office Locations

| Bluetooth Beacon Identifier | Office Number | User or Admin-Customized Location Data |
|---|---|---|
| UUID 1 | 100 | Dave's office |
| UUID 2 | 110 | 1$^{st}$ floor break room |
| UUID 3 | 210 | 2$^{nd}$ floor break room |
| UUID 4 | 220 | Susan's office |
| UUID 5 | 310 | Lab - 3$^{rd}$ floor |

In Table 1, it can be seen that mappings 106 include fine grained, descriptive information corresponding to locations where Bluetooth beacons are located. Similar mappings may be stored for other types or placements of Bluetooth beacons. In the illustrated example, the user location information includes office numbers and user or admin-customized location descriptions that are mapped to Bluetooth beacon identifiers. The Bluetooth beacon identifiers in the illustrated example are iBeacon universally unique identifier (UUID) values which may be used to identify iBeacon devices. The UUID value is a 16 byte value and may also include a 2 byte major value and a 2 byte minor value. However, the subject matter described herein is not limited to using a UUID to identify a Bluetooth beacon. Any identifier output wirelessly by a Bluetooth beacon that can be mapped to a Bluetooth beacon location description is intended to be within the scope of the subject matter described herein.

The office numbers in Table 1 illustrate one example of fine grained user location information that can be associated with Bluetooth beacon identifiers. In the illustrated examples, the office numbers may include offices that are on different floors and that are on top of one another. GPS and cellular network derived location information may not be sufficiently granular to distinguish between offices that are adjacent to each other or on top of one another. The user customized location data may be input by a user or an operator to specify user or operator defined names for each office. In the illustrated example, the user customized location data includes the name of the person to which an office is assigned and/or the function of the office. Thus, even in systems where GPS derived location information is available indoors, such systems would only provide GPS coordinates and not the user customized location data or office numbers illustrated in Table 1.

Thus, from Table 1, rather than simply publishing raw location data, such as GPS coordinates, another aspect of the subject matter described herein includes the publication of a Bluetooth beacon location description, where such a description is a text string that describes the location of the Bluetooth beacon. The text string may be defined administrator of the Bluetooth beacon location service to which the user subscribes. The text string may also be customized by the user if permitted by the administrator. Server 100 may include a user or admin interface that allows users and/or administrators to load new Bluetooth beacon identifiers and Bluetooth beacon location descriptions into memory 104. In one embodiment, the interface may be a web interface accessible over a computer network, such as the Internet.

According to another aspect of the subject matter described herein, server 100 may provide Bluetooth beacon location service for plural different entities and may store sets of mappings between Bluetooth beacon identifiers and Bluetooth beacon location data for each of the entities. In such an embodiment, each entity specific set of Bluetooth beacon identifier to Bluetooth beacon location description mappings may be indexed by an entity identifier or by mobile device identifiers associated with each entity.

A mobile device 107 includes a location determining and publishing client 108 and a memory 110. Memory 110 contains a list of Bluetooth beacon identifiers obtained from Bluetooth beacon location server 100. The list may be the complete set of Bluetooth beacon identifiers for the organization to which the user belongs. Location determining and publishing client 108 queries Bluetooth beacon location server 100 for location information corresponding to a detected Bluetooth beacon identifier and communicates the location information to a publish-subscribe server to be published to other users. Mobile device 107 may be any suitable mobile computing device, such as a smart phone, a tablet computer, a laptop computer, or any other mobile computing device with Bluetooth communications capabilities.

One or more Bluetooth beacons 114 with Bluetooth beacon identifiers may communicate the Bluetooth beacon identifiers to Bluetooth devices that come within Bluetooth radio range of Bluetooth beacons 114. Bluetooth beacons 114 may be placed at locations at which it is desirable to determine the location of a mobile device. For example, in one embodiment, Bluetooth beacons 114 may be placed in different offices of a business or other organization. Bluetooth beacons 114 may by any suitable electronic devices that wirelessly emit beacon identifiers to nearby Bluetooth-enabled devices. As stated above, in one embodiment, Bluetooth beacons 114 may be iBeacons. An iBeacon emits a UUID, a major number, a minor number, and a message. The UUID alone or in combination with the major and minor numbers may be used by a mobile device to obtain its location from Bluetooth beacon location server 100.

The system further includes a publish-subscribe server 116 for receiving location information from mobile devices 107 and making that location information available to other users via a publish-subscribe interface 118. Publish-subscribe server 116 stores Bluetooth location descriptions 120 in its associated memory. When users subscribe to receive Bluetooth beacon or user location information, the information is automatically published to subscribers at subscription time and when the information is updated without requiring queries from the subscribers. In one embodiment, publish-subscribe server 116 comprises a presence server. A presence server allows users to subscribe to receive presence information for other users. Presence information typically indicates a user's availability to receive mobile or other communications. For example, presence information may indicate whether a particular user is online or available to receive a telephone call. When presence information is updated for a subscribed-to user, the subscribers will automatically receive an update in the presence information. The update may be in the form of a presence update message transmitted over a network to each subscribing device. According to an embodiment of the subject matter described herein, publish-subscriber server 116 may be used to distribute fine grained Bluetooth beacon derived location descriptions to other users.

Referring to the message flow in FIG. 1, in step 1, mobile device 107 configured with location determining and publishing client 108 obtains a Bluetooth beacon ID list from Bluetooth beacon location server 100. The Bluetooth beacon ID list may correspond to a set of Bluetooth beacons that provide a location service that client 108 is authorized to access. For example, the Bluetooth beacon ID list may include a list of Bluetooth beacon identifiers for Bluetooth beacons that are used within the corporate office location in which the user of client 108 works. In step 2, server 100 provides the Bluetooth beacon ID list to mobile device 107. Mobile device 107 stores the Bluetooth beacon ID list in memory 112.

In step 3, mobile device 107 receives a Bluetooth beacon identifier when mobile device 107 comes within Bluetooth radio range of one of Bluetooth beacons 114. In step 4, location determining and publishing client 108 queries Bluetooth beacon location server 100 for a Bluetooth beacon location description corresponding to the Bluetooth beacon identifier. In step 5, Bluetooth beacon location module 102 of Bluetooth beacon location server 100 obtains the location information from memory 104 and responds to mobile device 107 with the Bluetooth beacon location description corresponding to the Bluetooth beacon identifier.

In an embodiment where each mobile device user is permitted to store customized Bluetooth beacon location descriptions in Bluetooth beacon location server 100, the query may include the mobile device identifier in addition to the Bluetooth beacon identifier. In such a case, server 100 will use the Bluetooth beacon identifier and the mobile device or mobile subscriber identifier in the query so that the customized Bluetooth beacon location description for the subscriber can be accessed.

In step 6, location determining and publishing client 108 transmits the received Bluetooth beacon location description to publish-subscribe server 116. Publish-subscribe server 116 stores the Bluetooth beacon location description in memory 119 as beacon/user location and subscription data 120. Publish-subscribe interface 118, in step 8, then publishes the Bluetooth beacon location descriptions to subscribers who are subscribed to receive updates in location information regarding mobile device 107. As stated above, in one embodiment, publish-subscribe interface 118 may be a presence interface that publishes the location information to subscribers of a mobile device user using a presence protocol.

It should be noted that the location description publishing step (step 6 in FIG. 1), in one embodiment may be performed automatically by client 108 without requiring action or authorization on the part of the publishing mobile device user at publishing time. In such an embodiment, the user may indicate the user's willingness to automatically publish his or her location at the time that client 108 first registers with server 100 for Bluetooth beacon location service. In an alternate embodiment, once a Bluetooth beacon location description is obtained from server 100, client 100 may prompt the user for authorization to publish the Bluetooth beacon location description. If the user provides such authorization, client 108 may make the location description available to server 116 for publication. If the user does not provide such authorization, the client 108 may refrain from communicating the Bluetooth beacon location description to server 116.

Figure 2:
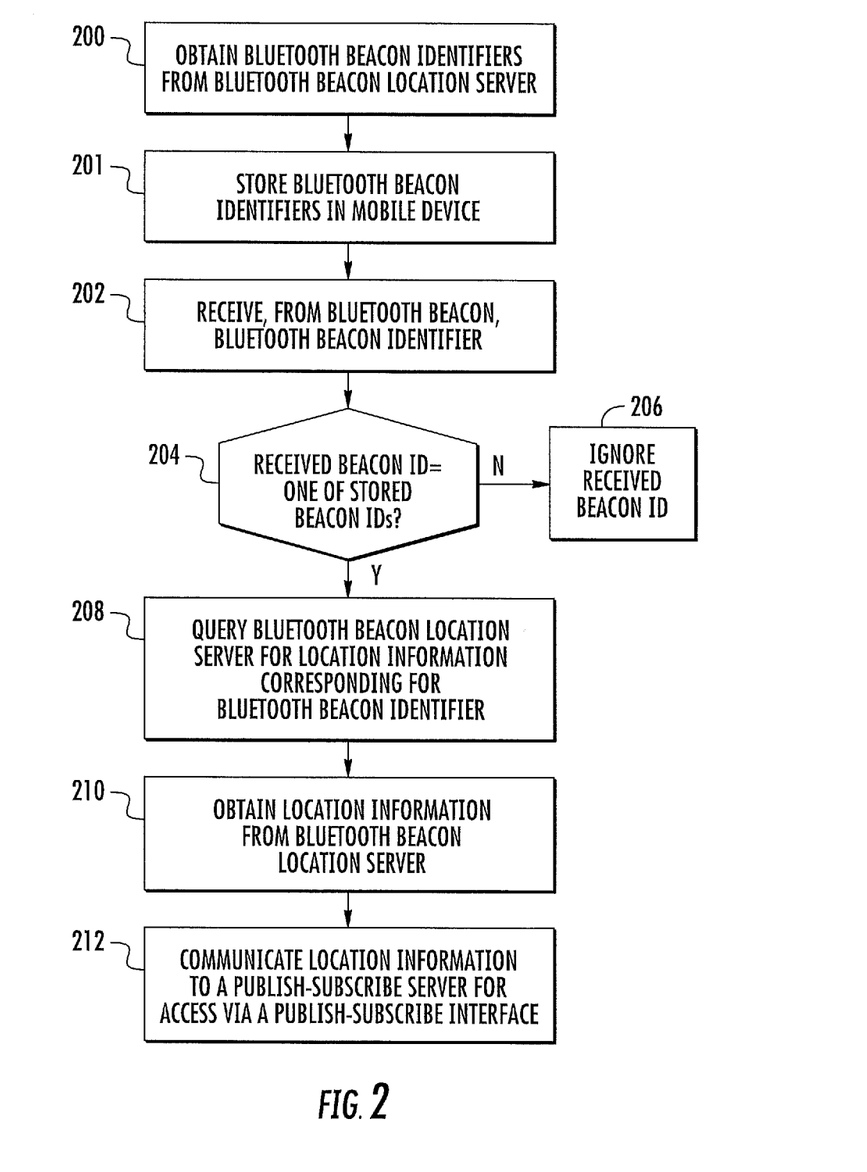
FIG. 2 is a flow chart illustrating an exemplary process executed by a Bluetooth beacon location determining and publishing client for using Bluetooth beacon identifier to obtain and publish mobile device location information according to an embodiment of the subject matter described herein.

FIG. 2 is a flow chart illustrating an exemplary process performed by location determining and publishing client 108 in obtaining and publishing fine-grained descriptions of its location using Bluetooth beacon identification information according to an embodiment of the subject matter described herein. Referring to FIG. 2, in step 200, client 108 obtains Bluetooth beacon identifiers from Bluetooth beacon location server 100. This step may be accomplished by sending a query to server 100 over a computer network, such as the Internet. Location determining and publishing client 108 may be preconfigured with the URL or IP address of Bluetooth beacon location server 100. If the Bluetooth beacons are iBeacons, then the list of Bluetooth beacon identifiers may be a list of iBeacon UUIDs. In step 201, the Bluetooth beacon identifiers are stored in the mobile device. For example, client 108 may store the Bluetooth beacon identifiers in memory 110.

In step 202, location determining and publishing client 108 receives a Bluetooth beacon identifier detected by a mobile device 107 when mobile device comes within Bluetooth radio range of a Bluetooth beacon 114. Continuing with the iBeacon example, the Bluetooth beacon identifier may be a UUID with major and minor numbers. In step 204, location determining and publishing client 108 determines whether the received Bluetooth beacon identifier corresponds to one of the stored Bluetooth beacon identifiers. Step 204 may be accomplished by comparing the received Bluetooth beacon identifier to those in the list received from server 100. If the received Bluetooth beacon identifier is not one of the Bluetooth beacon identifiers in the list received from server 100, control proceeds to step 206 where the received Bluetooth beacon identifier is ignored.

If the received Bluetooth beacon identifier is one of the stored Bluetooth beacon identifiers, control proceeds to step 208 where location determining and publishing client 108 queries Bluetooth beacon location server 100 for location information corresponding to the received Bluetooth beacon identifier. The query may be transmitted over a computer network, such as the Internet, to the URL or IP address of Bluetooth beacon location server 100. In step 210, location determining and publishing client 108 receives the location information from Bluetooth beacon location server 100. The location information may be a Bluetooth beacon location description that describes the location of the Bluetooth beacon that is currently located proximally to the mobile device.

In step 212, location determining and publishing client 108 communicates the location information to publish-subscribe server 116 for access by authorized subscribers via a publish-subscribe interface 118. As stated above, in one embodiment, publish-subscribe server 116 may be a presence server and publish-subscribe interface 118 may be presence interface. Thus, step 212 may be accomplished by sending a presence status update message to server 116 where the presence status update message includes the Bluetooth beacon location description obtained using the Bluetooth beacon identifier. As stated above, step 212 may be performed automatically by client 108 without user input or authorization at publication time. In an alternate embodiment, step 212 may only be performed after prompting and receiving authorization from the mobile device user whose location is being published.

Figure 3:
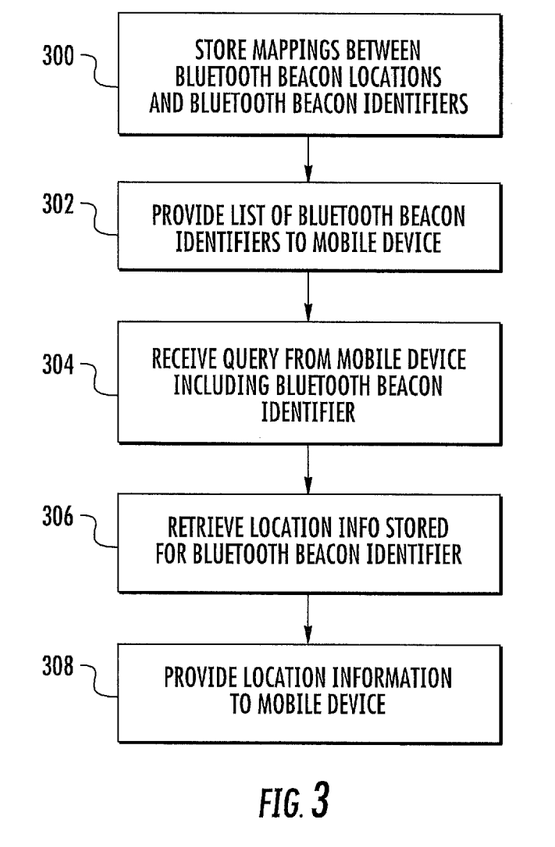
FIG. 3 is a flow chart illustrating an exemplary process performed by a Bluetooth beacon location server for using Bluetooth beacon identifiers to obtain and publish Bluetooth beacon location information according to an embodiment of the subject matter described herein.

FIG. 3 is a flow chart illustrating an exemplary process performed by Bluetooth beacon location server 100 for allowing users to use Bluetooth beacon identifiers to obtain location information. Referring to FIG. 3, in step 300, server 100 stores mappings between Bluetooth beacon location descriptions and Bluetooth beacon identifiers. The stored mappings may be provisioned by the operator of Bluetooth beacon location server 100. For example, the Bluetooth beacon location server 100 may store mappings between the Bluetooth beacon identifiers and descriptions of office locations for all of the Bluetooth beacons located in offices of a particular organization. In addition, as stated above, if server 100 provides Bluetooth beacon location information to multiple different organizations, server 100 may store mappings between Bluetooth beacon identifiers and descriptions of locations of Bluetooth beacons for each organization.

In step 302, server 100 provides a list of Bluetooth beacon identifiers to mobile device 107. The list of Bluetooth beacon identifiers may define the search space of Bluetooth beacon identifiers in a particular Bluetooth beacon location service. For example, the list of Bluetooth beacon identifiers may be a list of all of the Bluetooth beacon identifiers for a particular organization. If Bluetooth beacon location server 100 provides Bluetooth beacon location services for different organizations, the list of Bluetooth beacon identifiers that are transmitted to a particular mobile device may be those corresponding to the organization to which the mobile device belongs. Step 302 may be effected by responding to a query from a mobile device and providing the information after authenticating the device. Continuing with the case where the Bluetooth beacon location server 100 provides Bluetooth beacon location services for multiple organizations, the query from mobile device 107 may include a mobile device identifier or an organization identifier that server 100 maps to the location service for a particular organization.

In step 304, server 100 receives a Bluetooth beacon location query from a mobile device. The query may include a Bluetooth beacon identifier. The query may also include the mobile device or organization identifier in the case where Bluetooth beacon location server 100 serves multiple different organizations. According, in step 306, server 100 retrieves the stored location information for the Bluetooth beacon identifier. Continuing with the office example, the stored location information may include an office number within an organization where the Bluetooth beacon corresponding to the Bluetooth beacon identifier resides. The location information may also or alternatively a customized Bluetooth beacon location description, such as that illustrated in Table 1.

In step 308, server 100 provides the Bluetooth beacon location information to the mobile device. Providing the Bluetooth beacon location information to the mobile device may be effected by transmitting a message over a computer network, such as the Internet, to the mobile device. Server 100 may determine the IP or other network address of mobile device 107 from the query sent by mobile device 107. Alternatively, if a connection based protocol is used between client 108 and server 100, server 100 may determine the IP or network address of mobile device 107 from the connection establishment process. The message sent to the mobile device may include the Bluetooth beacon location description, for example, as a text string carried in the payload of the message.

Figure 4:
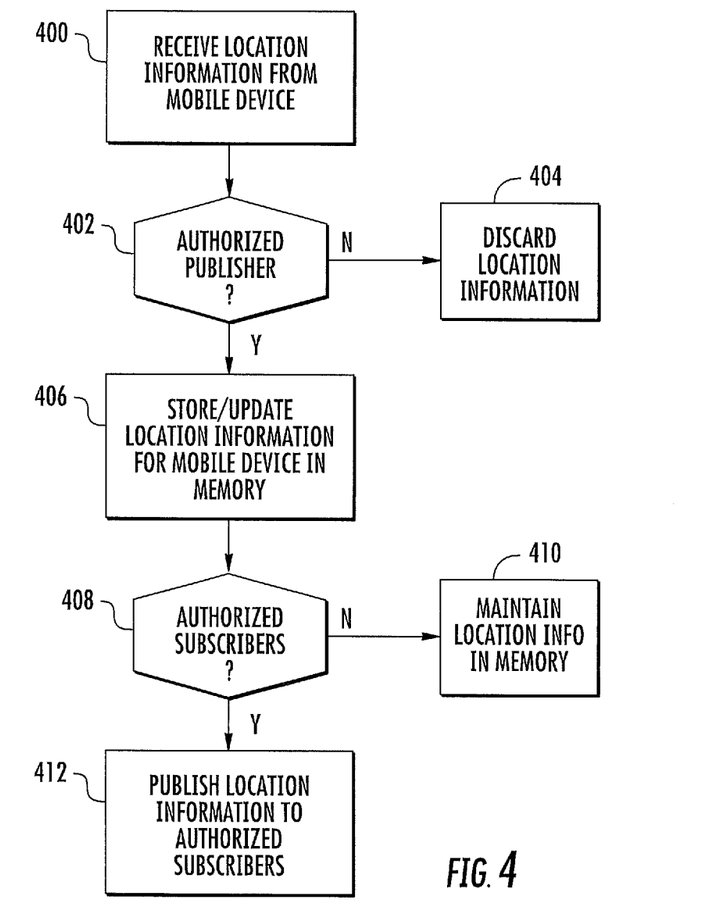
FIG. 4 is a flow chart illustrating an exemplary Bluetooth beacon location updating and publishing process performed by a publish-subscribe server for publishing Bluetooth-beacon-derived mobile device location information according to an embodiment of the subject matter described herein.

FIG. 4 is a flow chart illustrating an exemplary location updating and publishing process that may be performed publish-subscribe server 116 in publishing Bluetooth-beacon-determined location information received from a mobile device. Referring to FIG. 4, in step 400, server 116 receives location information from a mobile device. The location information may be the Bluetooth beacon location description obtained using the Bluetooth beacon identifier, as described above. The information may be provided to server 116 using the JavaScript object notification (JSON) or a presence protocol message. In step 402, it is determined whether the mobile device is an authorized publisher. Determining whether the mobile device is an authorized publisher may include searching a database of mobile device identifiers that correspond to mobile devices that are permitted to use the publication services provided by server 116. If the mobile device is not an authorized publisher, control proceeds to step 404 where the location information is discarded.

If it is determined that the mobile device is an authorized publisher of location information, control proceeds to step 406 where the Bluetooth beacon location description is stored or updated in memory 119. If memory 119 contains a prior Bluetooth beacon location description for the mobile device, then stored Bluetooth beacon location description may be updated by the new Bluetooth beacon location description. If no Bluetooth beacon location description is currently stored for the mobile device, a new record with the new Bluetooth beacon location description may be created in memory 119.

In step 408, if it is determined whether memory 119 stores information regarding subscribers that are registered or subscribed to receive Bluetooth beacon location descriptions regarding the mobile device user. If there are no registered subscribers, control proceeds to step 412 where the location information is maintained in memory 119. If subscribers are present, control proceeds to step 412 where the current Bluetooth beacon location description for the mobile device user is published to the subscribers. The publication may be effected via publish-subscribe interface 118, which in one embodiment, may be a presence interface.

Figure 5:
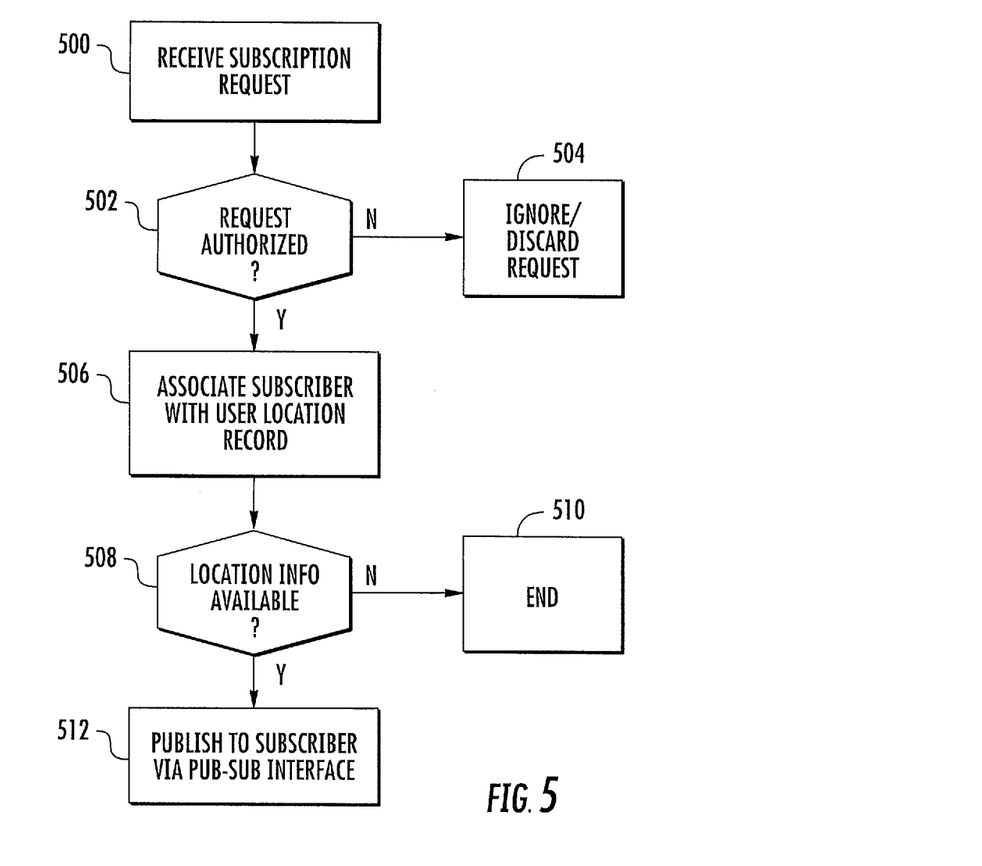
FIG. 5 is a flow chart illustrating an exemplary process for managing subscriptions by a publish-subscribe server according to an embodiment of the subject matter described herein.

FIG. 5 is a flow chart illustrating an exemplary process that may be performed by publish-subscribe server 116 in processing subscription requests for Bluetooth beacon derived location information regarding a mobile device user. Referring to FIG. 5, in step 500, server 116 receives a subscription request. The subscription request may specify the identifier of a mobile device or mobile device user to which the requesting user desires to subscribe for Bluetooth beacon derived location updates. In step 502, it is determined whether the request is authorized. Determining whether the request is authorized may include searching a database of authorized or unauthorized identifiers of subscribers for the particular user. In another implementation, the subscribed-to user may respond to subscription authorization queries as the queries occur. For example, when a subscriber attempts to subscribe to location information for a particular user, server 116 may send a query to the user that requests permission for the subscription to occur. If the user responds affirmatively, the subscription request is authorized. If the user responds negatively, the subscription request is not authorized.

Returning to FIG. 5, if the subscription request is not authorized, control proceeds to step 504 where the request is discarded. If the subscription request is authorized, control proceeds to step 506 where the subscriber is associated with the user location record.

In step 508, it is determined whether Bluetooth beacon derived location information is available in the record. If location information is not available, control proceeds to step 510 where the subscription processing ends. If location information is available, control proceeds to step 512 where the information is published to the subscriber via the publish-subscribe interface.

Figure 6:
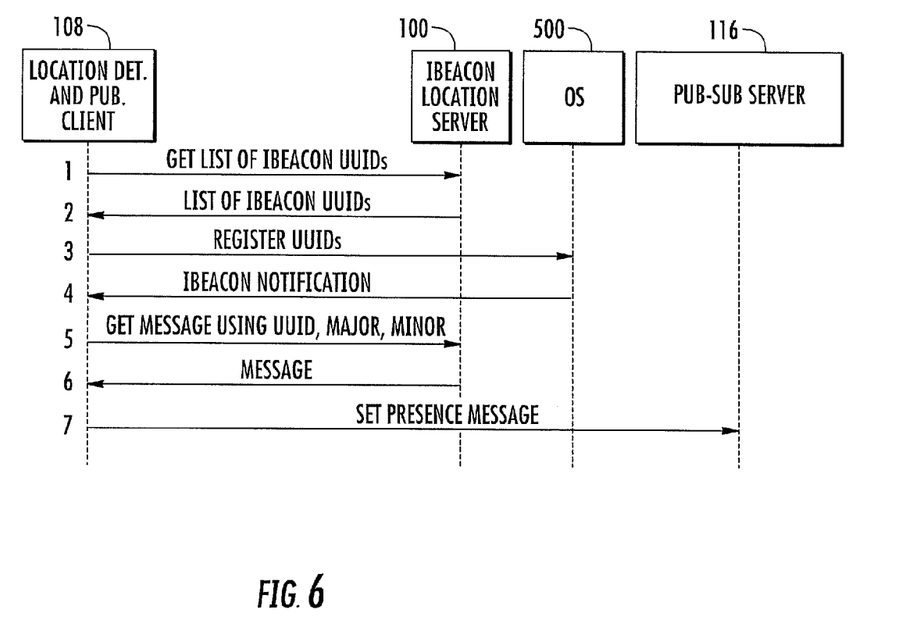
FIG. 6 is a message flow diagram illustrating an exemplary process for using iBeacons to obtain and publish fine grained mobile device location information according to an embodiment of the subject matter described herein.

FIG. 6 is a message flow diagram illustrating exemplary messages that may be exchanged between client 108, server 100, the operating system of mobile device 107, and publish-subscribe server 116 in using iBeacon identifiers to obtain and publish user device location information. Referring to the diagram in FIG. 6, in line 1, client 108 requests the list of iBeacon UUIDs from server 100. In step 2, iBeacon location server 100 provides the list of iBeacon UUIDs to location determination and publishing client 108. In step 3, client 108 registers the received UUIDs with operating system 500 of mobile device 107.

In step 4, client 108 receives a notification from operating system 500 that an iBeacon notification has been received. The iBeacon notification may have the following format:
beaconId: the beacon's UUID,
major: the beacon's major number,
minor: the beacon's minor number,
message: the message In step 5, client 108 sends a query message to server 100 to obtain the Bluetooth beacon location description. The message includes the UUID of the iBeacon, and the major and minor numbers. In step 6, server 100 communicates the Bluetooth beacon location description to client 108. In step 7, client 108 formulates and sends a presence message to publish-subscribe server 116. Thus, using the subject matter described herein, fine grained descriptions of user locations can be obtained using Bluetooth beacon identifiers and selectively published under the control of the mobile device user using a publish-subscribe interface.

Thus, Bluetooth beacon location server 100, mobile device 107 configured with client 108 and publish-subscribe server 116 improve the technological areas of locating and publishing the Bluetooth-beacon-derived location of mobile devices. Bluetooth beacon location server 100, mobile device 107 configured with client 108, and publish-subscribe server 116 may be capable of providing fine grained location information, including user customized location information in indoor environments, such as office environments, where GPS and cellular derived location information are not sufficient to pinpoint the location of a user with respect to a structure, such a room. Each of server 100, mobile device 107, and publish-subscribe server 116, when configured as described herein comprises a special purpose computing platform that performs the functions described herein.

According to another aspect of the subject matter described herein, Bluetooth beacons 114 transmit their identifiers but not their locations to mobile devices 107. As a result, mappings between Bluetooth beacon identifiers and Bluetooth beacon location information can be flexibly assigned and updated in memory of Bluetooth beacon location server 100. This flexibility allows the locations of Bluetooth beacons 114 to be changed, and the mappings maintained by server 100 can be easily updated to match such changes. Not requiring Bluetooth beacons 114 to determine and transmit their own locations also reduces the hardware cost of a system that uses such identifiers.

According to another aspect of the subject matter described herein, client 108 may publish a default location description when mobile device 107 is not in Bluetooth radio range of any of the set of Bluetooth beacons 114 that client 108 receives from server 107. The default location description may be a generic location description that is provided to client 108 when client 108 initially contacts or logs into server 100. For example, if the location service is provided by the client's employer, the default location description may be "at work" if the user initially logs into server 100 when the user arrives at work. In another example, if the default location description may be null (no characters) or information that indicates the users out of range status, such as "out of Bluetooth beacon range". The default location description may also be published by client 108 when client 108 is initially in range of a Bluetooth beacon and subsequently goes out of range of the Bluetooth beacon without going in range of another Bluetooth beacon recognized by client 108.

According to yet another aspect of the subject matter described herein, client 108 may display Bluetooth-beaconderived location information for contacts, friends, or other groups specified by the mobile device user. For example, client 108 may, in response to input from the user, subscribe with publish-subscriber server 116 to receive Bluetooth-beacon-derived location information for other users. When publish-subscribe-server 116 receives Bluetooth beacon location information for one of the subscribers to which the user is subscribed, the location information is delivered to the subscribing user. Client 108, in response to receiving a Bluetooth beacon location description for a mobile device user to which its user has subscribed, may display the Bluetooth beacon location description to the subscribing user. In one non-limiting example, if a user of client 108 is subscribed to receive Bluetooth beacon location descriptions for specific co-workers when at work, the user's Favorites or Contacts interface for the co-workers on the user's mobile device may display the current Bluetooth beacon location description for each of the user's co-workers.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for utilizing Bluetooth beacon information to obtain and publish fine grained user location information, the method comprising:
    storing a plurality of Bluetooth beacon identifiers in a mobile device;
    receiving, from a Bluetooth beacon, a Bluetooth beacon identifier, the Bluetooth beacon being a device separate from the mobile device and for providing the Bluetooth beacon identifier, which is mapped to Bluetooth beacon location information that serves to identify a location of mobile devices in Bluetooth connectivity range of the Bluetooth beacon;
    determining whether the received Bluetooth beacon identifier corresponds to one of the stored Bluetooth beacon identifiers; and
    in response to determining that the received Bluetooth beacon identifier corresponds to one of the stored Bluetooth beacon identifiers:
        querying a Bluetooth beacon location server for the Bluetooth beacon location information to which the Bluetooth beacon identifier is mapped;
        receiving the Bluetooth beacon location information from the server; and
        publishing the Bluetooth beacon location information to subscribers of a user of the mobile device, wherein publishing the Bluetooth beacon location information includes communicating the Bluetooth beacon location information to a publish-subscribe server, wherein the publish-subscribe server automatically publishes updates in Bluetooth beacon location information to the subscribers of the user of the mobile device via a publish-subscribe interface in response to receiving new Bluetooth beacon location information from the Bluetooth beacon location server and without requiring queries from the subscribers.

2. The method of claim 1 wherein the Bluetooth beacon location information comprises a Bluetooth beacon location description that describes the location of the Bluetooth beacon.

3. The method of claim 1 wherein the Bluetooth beacon comprises an iBeacon.

4. The method of claim 1 wherein the Bluetooth beacon does not transmit its location to the mobile device.

5. The method of claim 1 wherein the publish-subscribe server comprises a presence server.

6. The method of claim 1 wherein publishing the Bluetooth beacon location information includes publishing Bluetooth beacon location information automatically without requiring authorization or input from the mobile device user at publication time.

7. The method of claim 1 comprising prompting the mobile device user for authorization to publish the Bluetooth beacon location information and wherein publishing the Bluetooth beacon location information comprises publishing the Bluetooth beacon location information in response to receiving authorization from the mobile device user.

8. The method of claim 1 comprising placing Bluetooth beacons in offices of a building and wherein publishing the Bluetooth beacon location information comprises publishing a description of an office location of the Bluetooth beacon.

9. A method for utilizing Bluetooth beacon identification information to obtain and publish a Bluetooth beacon location description, the method comprising:
    at a Bluetooth beacon location server:
        storing mappings between a plurality of Bluetooth beacon identifiers and Bluetooth beacon location descriptions;
        receiving a query from a mobile device, the query including a Bluetooth beacon identifier, the Bluetooth beacon identifier identifying a Bluetooth beacon being a device separate from the mobile device and for providing the Bluetooth beacon identifier, which is mapped to a location that serves to identify a location of mobile devices within Bluetooth connectivity range of the Bluetooth beacon;
        obtaining, for the Bluetooth beacon identifier, a Bluetooth beacon location description from one of the stored mappings and providing the Bluetooth beacon location description to the mobile device; and
        publishing the Bluetooth beacon location information to subscribers of a user of the mobile device, wherein publishing the Bluetooth beacon location information includes communicating the Bluetooth beacon location information to a publish-subscribe server for automatic publishing of updates in the Bluetooth beacon location information to the subscribers of the user of the mobile device via a publish-subscribe interface in response to receiving new Bluetooth beacon location information from the Bluetooth beacon location server and without requiring queries from the subscribers.

10. The method of claim 9 comprising, at the publish-subscribe server:
    receiving the Bluetooth beacon location description from the mobile device; and
    making the Bluetooth beacon location description available to the subscribers of the user of the mobile device via the publish-subscribe interface.

11. The method of claim 10 wherein the publish-subscribe interface comprises a presence interface.

12. The method of claim 10 wherein the Bluetooth beacon comprises an iBeacon.

13. The method of claim 9 wherein the stored mappings include descriptions of office locations where Bluetooth beacons are located and wherein providing the Bluetooth beacon location description includes providing a description of an office location to which the received Bluetooth beacon identifier is mapped.

14. A system for utilizing Bluetooth beacon information to obtain and publish fine grained user location information, the system comprising:
a mobile device including:
a memory for storing a plurality of Bluetooth beacon identifiers; and
a location determining and publishing client for receiving, from a Bluetooth beacon, a Bluetooth beacon identifier, the Bluetooth beacon identifier identifying a Bluetooth beacon being a device separate from the mobile device and for providing the Bluetooth beacon identifier, which is mapped to Bluetooth beacon location information that serves to identify a location of mobile devices within Bluetooth connectivity range of the Bluetooth beacon, the location determining and publishing client for determining whether the received Bluetooth beacon identifier corresponds to one of the stored Bluetooth beacon identifiers, in response to determining that the received Bluetooth beacon identifier corresponds to one of the stored Bluetooth beacon identifiers, querying a Bluetooth beacon location server for Bluetooth beacon location information to which the Bluetooth beacon identifier is mapped, receiving the location information from the Bluetooth beacon location server, and publishing the location information to subscribers of a user of the mobile device, wherein publishing the Bluetooth beacon location information includes communicating the Bluetooth beacon location information to a publish-subscribe server for automatic publishing of updates in the Bluetooth beacon location information to the subscribers of the user of the mobile device via a publish-subscribe interface in response to receiving new Bluetooth beacon location information from the Bluetooth beacon location server and without requiring queries from the subscribers.

15. The system of claim 14 wherein the Bluetooth beacon location information comprises a Bluetooth beacon location description that describes the location of the Bluetooth beacon.

16. The system of claim 14 wherein the Bluetooth beacon comprises an iBeacon.

17. The system of claim 14 wherein the Bluetooth beacon does not publish its location to the mobile device.

18. The system of claim 14 wherein the publish-subscribe server comprises a presence server.

19. The system of claim 14 wherein the location determining and publishing client is configured to publish Bluetooth beacon location information automatically without requiring authorization or input from the mobile device user at publication time.

20. The system of claim 14 wherein the location determining and publishing client is configured to prompt the mobile device user for authorization to publish the Bluetooth beacon location information and to publish the Bluetooth beacon location information in response to receiving authorization from the mobile device user.

21. The system of claim 14 wherein the Bluetooth beacon is located in an office and wherein the client publishes a description of the office in which the Bluetooth beacon resides.

22. A system for utilizing Bluetooth beacon information to obtain and publish a Bluetooth beacon location description, the system comprising:
a Bluetooth beacon location server including:
a memory for storing mappings between a plurality of Bluetooth beacon identifiers and corresponding Bluetooth beacon location descriptions;
a Bluetooth beacon location module for receiving a query from a mobile device including a Bluetooth beacon identifier, the Bluetooth beacon identifier identifying a Bluetooth beacon being a device separate from a mobile device and for providing the Bluetooth beacon identifier, which is mapped to Bluetooth beacon location information that serves to identify a location of mobile devices within Bluetooth connectivity range of the Bluetooth beacon, the Bluetooth beacon location module for obtaining a Bluetooth beacon location description from one of the stored mappings for the received Bluetooth beacon identifier, providing corresponding Bluetooth beacon location description to the mobile device; and
a location determining and publishing client for publishing the Bluetooth beacon location information to subscribers of the user of the mobile device by communicating the Bluetooth beacon location information to a publish-subscribe server, wherein the publish-subscribe server automatically publishes updates in Bluetooth beacon location information to the subscribers of the user of the mobile device via a publish-subscribe interface in response to receiving new Bluetooth beacon location information from the location server and without requiring queries from the subscribers.

23. The system of claim 22 wherein the publish-subscribe interface comprises a presence interface.

24. The system of claim 22 wherein the Bluetooth beacon comprises an iBeacon.

25. The system of claim 22 wherein the Bluetooth beacon location description describes an office in which the Bluetooth beacon is located.

26. A non-transitory computer readable medium having stored thereon executable instructions that when executed by the processor of a computer control the computer to perform steps comprising:
storing a plurality of Bluetooth beacon identifiers in a mobile device;
receiving, from a Bluetooth beacon, a Bluetooth beacon identifier, the Bluetooth beacon being a device separate from the mobile device and for providing the Bluetooth beacon identifier, which is mapped to Bluetooth beacon location information that serves to identify a location of mobile devices in Bluetooth connectivity range of the Bluetooth beacon;
determining whether the received Bluetooth beacon identifier corresponds to one of the stored Bluetooth beacon identifiers; and
in response to determining that the received Bluetooth beacon identifier corresponds to one of the stored Bluetooth beacon identifiers:
querying a Bluetooth beacon location server for the Bluetooth beacon location information to which the Bluetooth beacon identifier is mapped;
receiving the Bluetooth beacon location information from the server; and
publishing the Bluetooth beacon location information to subscribers of a user of the mobile device, wherein publishing the Bluetooth beacon location information includes communicating the Bluetooth beacon location information to a publish-subscribe server, wherein the publish-subscribe server automatically publishes updates in Bluetooth beacon location information to the subscribers of the user of the mobile device via a publish-subscribe interface in response to receiving new Bluetooth beacon location information from the Bluetooth beacon location server and without requiring queries from the subscribers.

27. A non-transitory computer readable medium having stored thereon executable instructions that when executed by the processor of a computer control the computer to perform steps comprising:

at a Bluetooth beacon location server:

storing mappings between a plurality of Bluetooth beacon identifiers and Bluetooth beacon location descriptions;

receiving a query from a mobile device, the query including a Bluetooth beacon identifier, the Bluetooth beacon identifier identifying a Bluetooth beacon being a device separate from the mobile device and for providing the Bluetooth beacon identifier, which is mapped to a location that serves to identify a location of mobile devices within Bluetooth connectivity range of the Bluetooth beacon;

obtaining, for the Bluetooth beacon identifier, a Bluetooth beacon location description from one of the stored mappings and providing the Bluetooth beacon location description to the mobile device; and publishing the Bluetooth beacon location information to subscribers of a user of the mobile device, wherein publishing the Bluetooth beacon location information includes communicating the Bluetooth beacon location information to a publish-subscribe server for automatic publishing of updates in the Bluetooth beacon location information to the subscribers of the user of the mobile device via a publish-subscribe interface in response to receiving new Bluetooth beacon location information from the Bluetooth beacon location server and without requiring queries from the subscribers.

* * * * *